US010988603B2

(12) United States Patent
Yuasa et al.

(10) Patent No.: US 10,988,603 B2
(45) Date of Patent: Apr. 27, 2021

(54) MOLDED RESIN STRAND

(71) Applicant: KYORAKU CO., LTD., Kyoto (JP)

(72) Inventors: Ryohei Yuasa, Kanagawa (JP); Takashi Nomura, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 132 days.

(21) Appl. No.: 15/764,214

(22) PCT Filed: Sep. 28, 2016

(86) PCT No.: PCT/JP2016/078560
§ 371 (c)(1),
(2) Date: Mar. 28, 2018

(87) PCT Pub. No.: WO2017/057424
PCT Pub. Date: Apr. 6, 2017

(65) Prior Publication Data
US 2018/0265685 A1    Sep. 20, 2018

(30) Foreign Application Priority Data
Sep. 29, 2015 (JP) .............................. JP2015-191861

(51) Int. Cl.
*C08L 23/12* (2006.01)
*B29B 11/10* (2006.01)
*B33Y 70/00* (2020.01)
*C08L 101/00* (2006.01)
*C08L 23/16* (2006.01)
*C08K 7/06* (2006.01)
*B29C 48/05* (2019.01)
*B29B 11/16* (2006.01)
*B29K 105/12* (2006.01)
*B29C 48/88* (2019.01)
*B29C 64/118* (2017.01)
*B29K 23/00* (2006.01)
*B29C 48/00* (2019.01)
*B29K 507/04* (2006.01)
*B29C 48/28* (2019.01)
*B33Y 10/00* (2015.01)
*B29K 307/04* (2006.01)

(52) U.S. Cl.
CPC .............. *C08L 23/12* (2013.01); *B29B 11/10* (2013.01); *B29B 11/16* (2013.01); *B29C 48/05* (2019.02); *B33Y 70/00* (2014.12); *C08K 7/06* (2013.01); *C08L 23/16* (2013.01); *C08L 101/00* (2013.01); *B29C 48/022* (2019.02); *B29C 48/28* (2019.02); *B29C 48/919* (2019.02); *B29C 64/118* (2017.08); *B29C 2948/92123* (2019.02); *B29C 2948/92428* (2019.02); *B29C 2948/92438* (2019.02); *B29K 2023/12* (2013.01); *B29K 2023/16* (2013.01); *B29K 2023/22* (2013.01); *B29K 2105/12* (2013.01); *B29K 2307/04* (2013.01); *B29K 2507/04* (2013.01); *B33Y 10/00* (2014.12); *C08L 2205/025* (2013.01); *C08L 2207/04* (2013.01)

(58) Field of Classification Search
CPC ........ C08L 23/12; C08L 101/00; C08L 23/16; C08L 2205/025; C08L 2207/04; C08K 7/06; B29B 11/10; B29B 11/16; B29C 48/919; B29C 64/118; B29C 2948/92438; B29C 2948/92123; B29C 48/022; B29C 48/28; B29C 2948/92428; B29C 48/05; B29K 2105/12; B29K 2023/22; B29K 2507/04; B29K 2023/16; B29K 2023/12; B29K 2307/04; B33Y 70/00; B33Y 10/00
See application file for complete search history.

(56) References Cited

U.S. PATENT DOCUMENTS

| 2001/0030383 | A1  | 10/2001 | Pollard |
| 2007/0003656 | A1  | 1/2007  | Labossiere |
| 2008/0118728 | A1  | 5/2008  | Moncla |
| 2009/0295032 | A1  | 12/2009 | Hopkins |
| 2010/0270707 | A1  | 10/2010 | Priedeman, Jr. |
| 2010/0327479 | A1* | 12/2010 | Zinniel .................. B29C 64/20 264/172.14 |
| 2015/0159003 | A1  | 6/2015  | Son et al. |

(Continued)

FOREIGN PATENT DOCUMENTS

| CN | 103739954 A | 4/2014 |
| CN | 103937278 A | 7/2014 |
| CN | 104693618 A | 6/2015 |

(Continued)

OTHER PUBLICATIONS

Extended European Search Report dated Apr. 1, 2019 for the corresponding EP Patent Application No. 16851595.5.

(Continued)

*Primary Examiner* — Patrick D Niland
(74) *Attorney, Agent, or Firm* — Maier & Maier, PLLC

(57) ABSTRACT

Provided is a molded resin strand configured so that interlayer fusion of a shaped object can be improved and mechanical aptitude (specifically, stiffness) in a 3D printer can be more improved even in a case where an inorganic filler such as carbon fibers is mixed. The molded resin strand contains thermoplastic resin, an inorganic filler, and α-olefin elastomer. The thermoplastic resin is polypropylene, for example. The inorganic filler is carbon fibers, for example. The α-olefin elastomer is ethylene-α-olefin copolymer, for example. The molded resin strand of the present invention is used for a 3D printer employing a fused deposition modeling method.

7 Claims, 2 Drawing Sheets

(56) References Cited

U.S. PATENT DOCUMENTS

2016/0122570 A1   5/2016  Woo
2017/0148539 A1*  5/2017  Prestayko ................. B29B 7/88

FOREIGN PATENT DOCUMENTS

| CN | 104761761 A | 7/2015 |
|---|---|---|
| JP | 2007051237 A2 | 3/2007 |
| JP | 4107960 B2 | 6/2008 |
| JP | 2009500194 | 1/2009 |
| JP | 2010506823 | 3/2010 |
| JP | 2010521339 | 6/2010 |
| JP | 5039549 B2 | 10/2012 |
| JP | 2014040576 A2 | 3/2014 |
| JP | 2016088101 A2 | 5/2016 |

OTHER PUBLICATIONS

International Search Report dated Nov. 8, 2016 filed in PCT/JP2016/078560.
Chinese Office Action (CNOA) dated Dec. 3, 2019 for corresponding Chinese Patent Application No. 201680056642.0.
Wang et al. "Polymer Modification", China Light Industry Press Ltd., Jun. 2000, 1st Edition, ISBN 7-5019-2625-5, pp. 79 and 82-83.
Decision of Rejection dated Oct. 29, 2020, in corresponding Chinese Application No. 201680056642.0 (8 pp., including machine-generated English translation).
Zheng, Mingxin, "Engineering Plastics," China Central Radio and Television University Press, Aug. 1986, 1st edition, pp. 262-263.

* cited by examiner

MOLDED RESIN STRAND

TECHNICAL FIELD

The present invention relates to a molded resin strand. Specifically, the present invention relates to a molded resin strand used as a raw material for a modeling device configured to build a three-dimensional object (a physical body), such as a 3D printer.

BACKGROUND ART

A so-called 3D printer has attracted attention as the method for forming a three-dimensional object. A three-dimensional object in a complicated shape which has been difficult to be realized can be easily produced. With the 3D printer, an optional material such as resin or metal is stacked so that a shape unavailable by a common method can be processed.

Some methods have been known as a 3D printer method. Of these methods, the method (a fused deposition modeling method) for laminating and depositing a resin strand (a molded resin strand) after extrusion of the resin strand is advantageous in terms of cost. In view of these points, the fused deposition modeling method has been developed from every perspective (see, e.g., Patent Literatures 1 and 2).

For example, in a lamination shaping system of Patent Literature 1, a filament as a shaping material is supplied to an extrusion head. The filament is melted at a liquefier mounted on the extrusion head, and then, the molten filament is extruded onto a base through a nozzle. The extrusion head and the base are movable relative to each other for formation of a 3D model. In this manner, many material lines and layers are laminated. As a result, the 3D model is manufactured.

Patent Literature 2 discloses a 3D object building method including delivering, by extrusion, a reformed ABS material to an extrusion head of a lamination deposition system, melting the delivered reformed ABS material at the extrusion head under conditions for improving a response time of the extrusion head, and depositing, in a layer-by-layer manner, a molten thermoplastic plastic material to form a 3D object.

A basic idea of the method of this type is melting and deposition of the resin material. A resin strand (a molded resin strand) is used as a raw material for this method. Patent Literatures 3 and 4 disclose a resin strand used as a raw material and the method for supplying the resin strand, for example.

Patent Literature 3 discloses a composition for producing a three-dimensional object. This composition is, as a flexible filament, supplied to an extrusion head of an extruder for producing a shaped object. The filament is melted in a liquefier carried with the extrusion head. The liquefier heats the filament to a temperature slightly higher than a solidification point, thereby bringing the filament into a molten state. The molten material is extruded onto a seat through an orifice of the liquefier.

Patent Literature 4 discloses a filament cassette configured to supply a filament in a three-dimensional deposition modeling machine and a filament cassette receiver. Patent Literature 4 provides the method for engaging/disengaging the filament with/from the modeling machine in a simple form. According to this method, a form can be realized, in which the filament is protected from moisture in environment.

CITATION LIST

Patent Literature

PATENT LITERATURE 1: JP-T-2009-500194
PATENT LITERATURE 2: JP-T-2010-521339
PATENT LITERATURE 3: Japanese Patent No. 5039549
PATENT LITERATURE 4: Japanese Patent No. 4107960

SUMMARY OF THE INVENTION

Problems to be Solved by the Invention

In the above-described methods, the resin strand supplied to the extrusion head is further supplied while being melted. In this manner, the resin strands are laminated and deposited into the three-dimensional object. In this method, a certain amount of inorganic filler, such as carbon fibers, or more is mixed with the filament, and therefore, mechanical properties (specifically, stiffness) in the 3D printer can be more improved. Further, contraction of the 3D model can be reduced.

Note that a problem newly caused due to mixing of the certain amount of inorganic filler (e.g., the carbon fibers) or more with the filament needs to be solved. In the molded resin strand used as the filament, a greater mixing ratio of the carbon fibers results in more mechanical property (specifically, stiffness) improvement. On the other hand, addition of the carbon fibers is a cause for decreasing delamination strength. This leads to a problem that the stiffness of the shaped object is lowered. For this reason, there is a problem that it is difficult for the 3D printer to provide a certain value of mechanical aptitude (specifically, stiffness) or more to the shaped object.

The present invention has been proposed in view of the above-described typical situation. The present invention is intended to provide a molded resin strand configured so that interlayer fusion of a shaped object can be improved and mechanical aptitude (specifically, stiffness) in a 3D printer can be more improved even in a case where an inorganic filler such as carbon fibers is mixed.

Solution to the Problems

For accomplishing the above-described goal, the molded resin strand of the present invention contains thermoplastic resin, an inorganic filler, and α-olefin elastomer.

In the molded resin strand mainly containing the thermoplastic resin, the inorganic filler such as carbon fibers is mixed so that high stiffness can be provided to a shaped object of a 3D printer, for example. Note that mixing of the inorganic filler such as the carbon fibers interferes with interlayer fusion of the shaped object. Specifically, a greater mixing ratio of the inorganic filler results in lower delamination strength, and therefore, the stiffness of the shaped object is lowered.

For this reason, in the present invention, the α-olefin elastomer is further mixed so that lowering of the delamination strength due to mixing of the inorganic filler can be reduced. Thus, the stiffness of the shaped object is ensured. Fusion properties are improved by mixing of the α-olefin elastomer. Further, shaping properties (the delamination strength) of a 3D model is significantly improved. By significant improvement of the delamination strength, the strength of the shaped object is held.

Effects of the Invention

According to the molded resin strand of the present invention, interlayer fusion of the shaped object can be improved even in the case of mixing the inorganic filler such as the carbon fibers. Thus, mechanical aptitude (specifically, stiffness) in the 3D printer can be more improved. The molded resin strand with various types of functionality can be provided. Thus, modeling with more types of functionality is available.

DESCRIPTION OF THE EMBODIMENTS

Hereinafter, an embodiment of a molded resin strand to which the present invention has been applied will be described with reference to the drawings. A 3D printer using the molded resin strand will be first described prior to description of the molded resin strand of the present embodiment.

In a basic mechanism of the 3D printer, 3D data produced by a computer is used as a design, and sectional shapes are laminated to produce a stereoscopic object, i.e., a three-dimensional (3D) object. Examples of such a method include an ink jet method for gradually hardening liquid resin by irradiation with ultraviolet light etc., a powder fixing method for spraying an adhesive to powder resin, and a fused deposition modeling method for gradually stacking resin melted by heat. The molded resin strand of the present embodiment is used for the fused deposition modeling method. This molded resin strand is supplied to the 3D printer with the molded resin strand being wound around a reel, for example.

Figure 1:
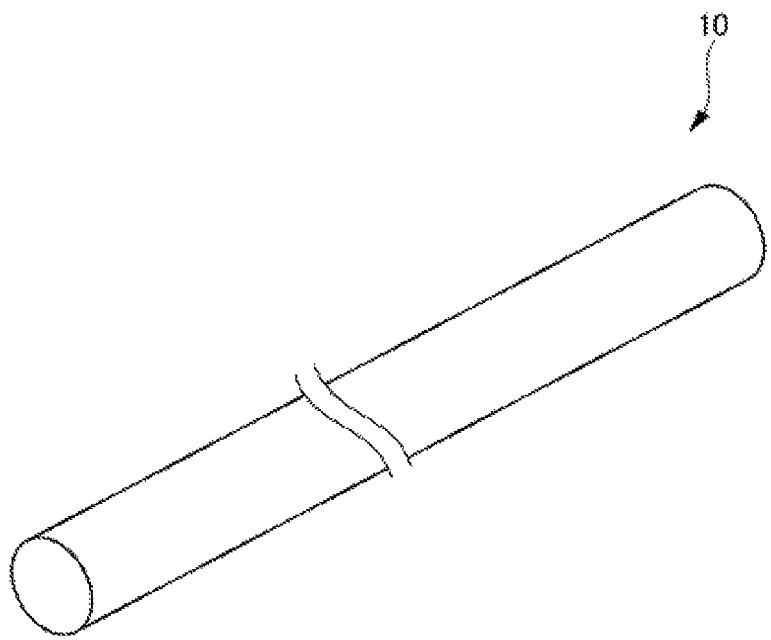
FIG. 1 is a schematic perspective view of an example of a molded resin strand.
Figure 2:
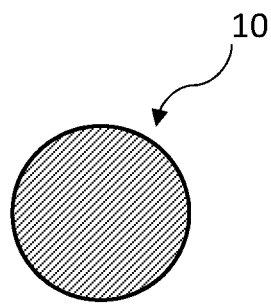
FIG. 2 is a sectional view of the molded resin strand illustrated in FIG. 1.

FIGS. 1 and 2 illustrate a so-called single-layer molded resin strand 10. The single-layer molded resin strand 10 has an extremely-simple configuration obtained in such a manner that a raw resin material is processed into a strand. The form of the molded resin strand is not limited to the above-described single layer, and may have a multilayer configuration of two or more layers.

Next, materials forming the molded resin strand of the present embodiment will be described. The molded resin strand of the present embodiment mainly contains thermoplastic resin. Any type of thermoplastic resin can be used as the thermoplastic resin. Examples of available thermoplastic resin include polyester resin such as polyolefin resin such as polypropylene resin, acrylonitrile-butadiene-styrene copolymer resin (ABS resin), polycarbonate resin, and polyethylene terephthalate (PET). Of these types of thermoplastic resin, the polypropylene resin is preferable because of reasons such as lightweight.

Considering moldability etc., the mixing ratio of the thermoplastic resin in the molded resin strand is preferably 40 mass % to 89 mass %, and more preferably 60 mass % to 79 mass %.

When the thermoplastic resin is used alone for the molded resin strand, this might lead to insufficient mechanical strength (stiffness). For this reason, an inorganic filler is mixed in the molded resin strand of the present embodiment for the purpose of strength compensation etc.

An inorganic filler in the form of fibers and an inorganic filler in the form of powder can be used as the inorganic filler. The material of such an inorganic filler can be selected as necessary. Material Examples include carbon fibers, glass fibers, talc, nanoclay, calcium carbonate, and magnesium carbonate. The carbon fibers are preferable because of lightweight and a high strength improvement effect upon addition.

The additive ratio of the inorganic filler can be set according to required mechanical properties etc. Such an additive ratio is preferably 10 mass % to 40 mass %, and more preferably 20 mass % to 30 mass %. When the mixing ratio of the inorganic filler is lower than 10 mass %, the effect (e.g., stiffness improvement) obtained by mixing of the inorganic filler might be insufficient. Conversely, when the mixing ratio of the inorganic filler is an extremely-high ratio of higher than 40 mass %, the percentage of the thermoplastic resin relatively becomes too low, and it might be difficult to perform shaping.

When the inorganic filler is mixed with the thermoplastic resin, tendency shows that interlayer fusion is insufficient when a shaped object is produced from the molded resin strand. As a result, the mechanical aptitude (the stiffness) of the shaped object is lowered. For this reason, in the molded resin strand of the present embodiment, α-olefin elastomer is mixed in addition to the thermoplastic resin and the inorganic filler. This improves delamination strength, and therefore, the mechanical aptitude is provided to the shaped object.

For example, the α-olefin elastomer is a copolymer of ethylene and α-olefin. Examples of the α-olefin include propylene and butylene. In this case, the content of the ethylene is preferably equal to or higher than 50 mol %. Representative examples of the α-olefin elastomer include ethylene-butene copolymer and ethylene-propylene copolymer. The physical properties of the α-olefin elastomer as the representative example are as follows:
(1) Ethylene-Butene Copolymer
Product name: TAFMER DF 605 manufactured by Mitsui Chemicals, Inc.
Ratio of building block derived from ethylene: equal to or higher than 50 mol %
Density: 861 kg/cm3
MFR (230° C.): 0.9 g/10 min
(2) Ethylene-Propylene Copolymer
Product name: ESPRENE SPO V0141 manufactured by Sumitomo Chemical Co., Ltd.
Ethylene/Propylene=67/27 (weight ratio)
Density: 860 kg/cm3
MFR (190° C., a load of 2.16 kg): 0.7 g/10 min The mixing ratio of the α-olefin elastomer is preferably 1 mass % to 20 mass %, and more preferably 1 mass % to 10 mass %. When the mixing ratio of the α-olefin elastomer is lower than 1 mass %, the delamination strength cannot be sufficiently improved. When the mixing ratio of the α-olefin elastomer exceeds 20 mass %, the physical properties of the molded resin strand are lowered. As a result, it might be difficult to maintain the mechanical strength (the stiffness) of the shaped object.

Mixing of the α-olefin elastomer is extremely effective when the polypropylene is used as the thermoplastic resin and the carbon fibers are used as the inorganic filler. This is because of the following reasons: the polypropylene is lightweight, and therefore, the delamination strength is significantly lowered upon addition of the carbon fibers as the inorganic filler.

Note that the reason for improvement of the delamination strength of the shaped object shaped using the molded resin strand of the present embodiment is unknown. However, it is assumed that the reason is a melting point decrease or resin softening due to the α-olefin elastomer contained in the molded resin strand. In a case where the melting point of the molded resin strand decreases, resin is not fully hardened on a resin lamination side upon resin lamination. Thus, improvement of the delamination strength of the shaped object can be expected.

In addition to the above-described materials, various additives such as a colorant can be added to the molded resin strand according to specifications etc. The outer diameter dimension of the molded resin strand can be set as necessary according to required specifications. The molded resin strand may be a filament with a diameter of about 1.75 mm, for example.

Figure 3:
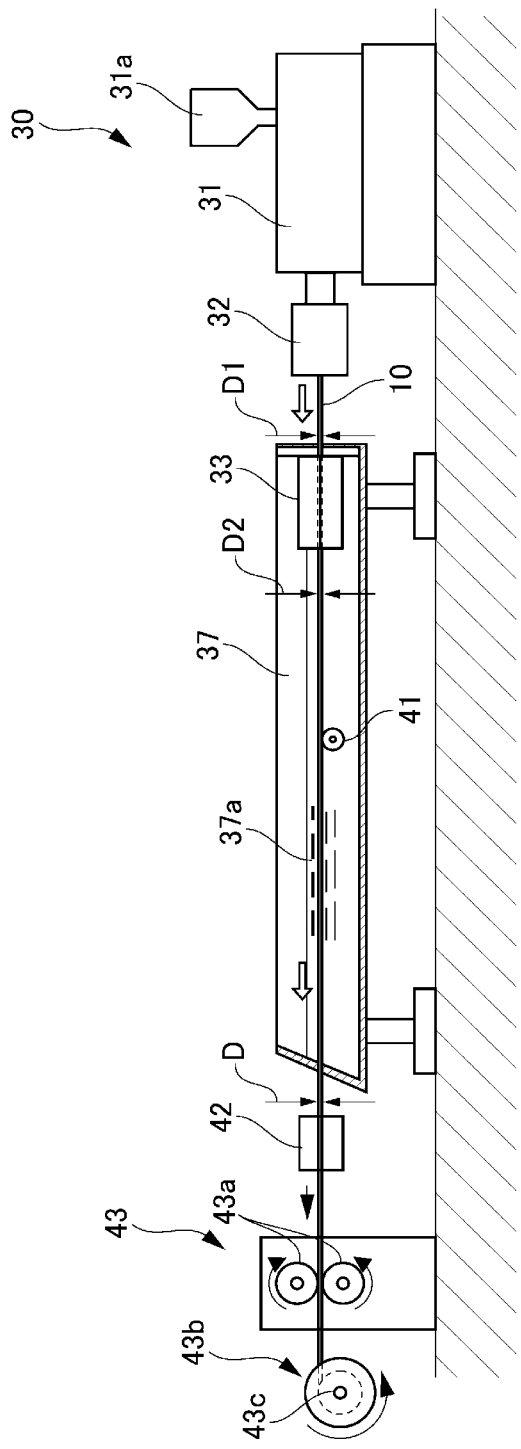
FIG. 3 is a view of an example of a manufacturing line of the molded resin strand.

Next, the method (the manufacturing line) for manufacturing the molded resin strand to which the present invention has been applied will be described. As illustrated in FIG. 3, a manufacturing line 30 for the molded resin strand 10 includes an extruder 31, a mold 32, a sizing device 33, a water tank 37, a fixed roller 41, an outer diameter dimension measurement device 42, and a winding device 43.

The extruder 31 is configured to melt and knead a raw resin material composition and continuously supply the resultant product to the mold 32. For example, the extruder 31 includes a cylinder having a built-in screw, a hopper for raw material injection, and an injection nozzle. The raw resin material composition injected from the hopper for raw material injection is melted and kneaded by the screw in the cylinder, and then, is injected from the injection nozzle to the mold 32.

The mold 32 extrudes the molten resin from the extruder 31 in the horizontal direction. The molten resin extruded from the mold 32 is cooled into a molded resin strand 10. The raw resin material composition is obtained in such a manner that the thermoplastic resin, the inorganic filler, and the α-olefin elastomer described above are mixed together.

The water tank 37 is formed in an elongated box shape along a conveyance direction of the molded resin strand 10 extruded from the extruder 31. The molded resin strand 10 is guided into the water tank 37 through one end wall of the water tank 37, and then, is guided out through the other end wall of the water tank 37. Water 37a in which the molded resin strand 10 is dipped and cooled is stored in the water tank 37.

The sizing device 33 is arranged inside the one end wall of the water tank 37. The sizing device 33 has the function of forming a section of the molded resin strand 10 sent from the extruder 31 into the water tank 37 into a perfect circle and uniformizing the outer diameter dimension of the molded resin strand 10 to a predetermined dimension.

The fixed roller 41 is configured to stabilize, in the water tank 37, the posture of the molded resin strand 10 having passed through the sizing device 33 and to convey the molded resin strand 10 toward the winding device 43.

The outer diameter dimension measurement device 42 is configured to measure the outer diameter dimension of the molded resin strand 10 cooled in the water tank 37. The winding device 43 includes a pair of upper and lower winding rollers 43a and a bobbin winder 43b. The above-described pair of upper and lower winding rollers 43a are configured to convey the molded resin strand 10 having passed through the outer diameter dimension measurement device 42 to a downstream side with the molded resin strand 10 being sandwiched between the winding rollers 43a. The bobbin winder 43b has a winding shaft 43c arranged downstream of the winding rollers 43a and configured to wind up the molded resin strand 10.

The method for manufacturing the molded resin strand 10 includes an extrusion step, a sizing step, a cooling step, a dimension measurement step, and a winding step. At the extrusion step, a resin pellet injected from the hopper 31a is melted in the extruder 31. Further, the molten resin is extruded from the mold 32. The outer diameter of the extruded molded resin strand 10 is D1.

At the sizing step, the molded resin strand 10 travels along a conveyance path. Thus, the molded resin strand 10 is formed with a uniform outer diameter D2 according to the inner diameter of the conveyance path. At the cooling step, the molded resin strand 10 is cooled by passing through the water tank 37. Thus, the outer diameter of the molded resin strand 10 is narrowed.

At the dimension measurement step, the outer diameter of the molded resin strand 10 is measured. Thus, it is determined whether or not a measurement value is a proper size. In a case where the outer diameter of the molded resin strand 10 is below standard, each manufacturing condition is reviewed such that the outer diameter falls within standard. In a case where the outer diameter of the molded resin strand 10 falls within standard, a continuous body of the molded resin strand 10 sent to the bobbin winder 43b by the winding rollers 43a of the winding device 43 is wound around the winding shaft 43c at the winding step. After a predetermined length of the molded resin strand 10 has been wound around the winding shaft 43c, the molded resin strand 10 is wound around another winding shaft 43c.

The manufactured molded resin strand 10 mainly contains the thermoplastic resin, as well as containing the inorganic filler and the α-olefin elastomer. Thus, improvement of the mechanical strength (the stiffness) by mixing of the inorganic filler and improvement of the delamination strength by mixing of the α-olefin elastomer can be simultaneously realized. Thus, the mechanical aptitude (specifically, the stiffness) in the 3D printer can be more improved.

The embodiment to which the present invention has been applied has been described above. Note that the present invention is not limited to the above-described embodiment, needless to say. Various changes can be made to the above-described embodiment without departing from the gist of the present invention.

EXAMPLES

Production of Molded Resin Strand

First Example

A raw material composition was prepared in such a manner that 27 mass % of carbon fibers (CF) and 10 mass % of α-olefin elastomer A (Product name: TAFMER DF 605 manufactured by Mitsui Chemicals, Inc.) are mixed with polypropylene (PP). After the raw material composition had been melted and kneaded by the extruder, the resultant was supplied to a die core. The supplied composition was drawn from a ferrule provided at the die core. A strand diameter and a strand shape were adjusted to some extent by the ferrule, and then, a molded resin strand was shaped. Thereafter, the final sectional shape (the strand diameter and the strand shape) of the molded resin strand was adjusted by sizing at an inlet portion of the water tank for cooling and hardening. After having been shaped by sizing, the molded resin strand was cooled and hardened in the water tank, and then, was wound by the winder. Further, the molded resin strand sent out of the winder was wound around a bobbin.

Second Example

A molded resin strand was produced in the same manner as that of the first example, except that a raw material composition was prepared in such a manner that 21 mass % of carbon fibers and 10 mass % of α-olefin elastomer A (Product name: TAFMER DF 605 manufactured by Mitsui Chemicals, Inc.) are mixed with polypropylene.

Third Example

A molded resin strand was produced in the same manner as that of the first example, except that a raw material composition was prepared in such a manner that 21 mass % of carbon fibers and 1 mass % of α-olefin elastomer A (Product name: TAFMER DF 605 manufactured by Mitsui Chemicals, Inc.) are mixed with polypropylene.

Fourth Example

A molded resin strand was produced in the same manner as that of the first example, except that a raw material composition was prepared in such a manner that 21 mass % of carbon fibers and 10 mass % of α-olefin elastomer B (Product name: TAFMER DF 810 manufactured by Mitsui Chemicals, Inc.) are mixed with polypropylene.

Fifth Example

A molded resin strand was produced in the same manner as that of the first example, except that a raw material composition was prepared in such a manner that 21 mass % of carbon fibers and 10 mass % of α-olefin elastomer C (Product name: TAFMER DF 640 manufactured by Mitsui Chemicals, Inc.) are mixed with polypropylene.

Sixth Example

A molded resin strand was produced in the same manner as that of the first example, except that a raw material composition was prepared in such a manner that 21 mass % of glass fibers and 10 mass % of α-olefin elastomer A (Product name: TAFMER DF 605 manufactured by Mitsui Chemicals, Inc.) are mixed with polypropylene.

First Comparative Example

A molded resin strand was produced in the same manner as that of the first example, except that a raw material composition was prepared in such a manner that only 30 mass % of carbon fibers is mixed with polypropylene.

Second Comparative Example

A molded resin strand was produced in the same manner as that of the first example, except that a raw material composition was prepared in such a manner that only 21 mass % of carbon fibers is mixed with polypropylene.

Third Comparative Example

A molded resin strand was produced in the same manner as that of the first example, except that a raw material composition was prepared in such a manner that only 21 mass % of glass fibers is mixed with polypropylene.

(Confirmation of Effects)

Using the produced molded resin strand, a shaped object with a length of 50 mm×a width of 20 mm×a thickness of 4 mm was produced by a 3D printer (Product name: BS-01 manufactured by Bonsai Lab, Inc.). Shaping was performed under a temperature of 230° C. as a condition upon shaping of the shaped object. The stiffness of the resultant shaped object was evaluated at a bending test. A universal testing machine (Product name: AGS-10kNJ manufactured by Shimadzu Corporation) was used for the bending test. The bending test was implemented by three-point bending. Moreover, a shaped object with a length of 50 mm×a width of 20 mm×a thickness of 0.6 mm was produced. The delamination strength of the shaped object was measured. One end of the shaped object was fixed with the one end being pinched by a vise, and the other end of the shaped object was fixed with the other end being pinched by a push-pull gauge (Product name: DS2-500N manufactured by Imada Co., Ltd.). Thereafter, strength upon delamination was measured as the delamination strength in the course of pulling a test piece in the horizontal direction. Results are shown in Table 1. Table 2 shows physical property values of the α-olefin elastomers A to C used for each example.

TABLE 1

| | Composition of Molded Resin Strand (mass %) | | | | | | Evaluation Results | | |
|---|---|---|---|---|---|---|---|---|---|
| | Polypropylene | Carbon Fibers | Glass Fibers | α-Olefin Elastomer A | α-Olefin Elastomer B | α-Olefin Elastomer C | Bending Elastic Modulus (MPa) | Maximum Bending Stress (MPa) | Shaped Object Delamination Strength (N) |
| First Example | 63 | 27 | — | 10 | — | — | 9109 | 126 | 121 |
| Second Example | 69 | 21 | — | 10 | — | — | 8722 | 131 | 115 |
| Third Example | 78 | 21 | — | 1 | — | — | 7134 | 100 | 127 |
| Fourth Example | 69 | 21 | — | — | 10 | — | 6031 | 103 | 107 |
| Fifth Example | 69 | 21 | — | — | — | 10 | 7569 | 112 | 110 |
| Sixth Example | 69 | — | 21 | 10 | — | — | 2763 | 34 | 138 |
| First Comparative Example | 70 | 30 | — | — | — | — | 8183 | 96 | 81 |

TABLE 1-continued

| | Composition of Molded Resin Strand (mass %) | | | | | Evaluation Results | | |
| | | | | | | Bending Elastic | Maximum | Shaped Object |
| | Polypropylene | Carbon Fibers | Glass Fibers | α-Olefin Elastomer A | α-Olefin Elastomer B | α-Olefin Elastomer C | Modulus (MPa) | Bending Stress (MPa) | Delamination Strength (N) |
|---|---|---|---|---|---|---|---|---|---|
| Second Comparative Example | 79 | 21 | — | — | — | — | 6139 | 84 | 86 |
| Third Comparative Example | 79 | — | 21 | — | — | — | 1934 | 22 | 92 |

TABLE 2

| | | α-Olefin Elastomer A | α-Olefin Elastomer B | α-Olefin Elastomer C |
|---|---|---|---|---|
| MFR | 190° C. 2.16 kg | 0.5 | 1.2 | 3.6 |
| Density | g/cm3 | 0.861 | 0.864 | 0.885 |
| Tensile Strength | MPa | >5 | >37 | >3 |
| Surface Hardness | ShoreA | 58 | 87 | 56 |
| Melting Point | ° C. | <50 | 66 | <50 |

As will be clearly seen from Table 1, interlayer fusion of a 3D model is favorable due to addition of the α-olefin elastomer in the first to fifth examples to which the present invention has been applied. Thus, high stiffness is exhibited. On the other hand, the mixing ratio of the carbon fibers is a high ratio of 30 mass % in the first comparative example. This shows insufficient interlayer fusion. As a result, the values of the bending elastic modulus, the maximum bending stress, and the shaped object delamination strength in a 3D model are lower than those of the first example. Similarly, in the second comparative example where the mixing ratio of the carbon fibers is 21 mass %, interlayer fusion is also insufficient. As a result, the values of the maximum bending stress and the shaped object delamination strength are lower than those in the second to fifth examples where the same mixing ratio of the carbon fibers is applied.

In the sixth example using the glass fibers, the values of the bending elastic modulus and the maximum bending stress are slightly lower than those in the examples and comparative examples using the carbon fibers. Note that these values are improved as compared to the third comparative example where no α-olefin elastomer is added. Moreover, the most excellent value of the shaped object delamination strength is obtained.

As will be clearly seen from the above-described measurement results, the molded resin strand used for the 3D printer employing the fused deposition modeling method is configured such that the carbon fibers as the inorganic filler are mixed with the polypropylene as the thermoplastic resin and the α-olefin elastomer is further mixed. With this configuration, a high-stiffness shaped object exhibiting excellent interlayer fusion in a 3D model can be manufactured. Such a shaped object is used as a raw material of a three-dimensional object so that modeling can be performed with higher functionality, for example.

The invention claimed is:

1. A molded resin strand comprising:
   60 to 79 mass % of thermoplastic resin;
   20 to 30 mass % of an inorganic filler; and
   1 to 10 mass % of α-olefin elastomer, wherein
   the thermoplastic resin is polypropylene, and
   the molded resin strand is a molded resin strand used for
      a 3D printer employing a fused deposition modeling
      method.
2. The molded resin strand according to claim 1, wherein the inorganic filler is a carbon fiber.
3. The molded resin strand according to claim 1, wherein the α-olefin elastomer is ethylene-α-olefin copolymer.
4. The molded resin strand according to claim 2, wherein the α-olefin elastomer is ethylene-α-olefin copolymer.
5. The molded resin strand according to claim 1, wherein the inorganic filler is one selected from a group consisting of glass fibers, talc, nanoclay, calcium carbonate and magnesium carbonate.
6. The molded resin strand according to claim 1, wherein an amount of the thermoplastic resin with respect to the molded resin strand is 63 to 78 mass %, an amount of the inorganic filler with respect to the molded resin strand is 21 to 27 mass % and an amount of the α-olefin elastomer with respect to the molded resin strand is 10 mass %.
7. The molded resin strand according to claim 1, wherein the inorganic filler is one selected from a group consisting of nanoclay and magnesium carbonate.

* * * * *